United States Patent [19]

Herb

[11] 4,252,289
[45] Feb. 24, 1981

[54] TWO-PART PIPE CLIP
[75] Inventor: Armin Herb, Peissenberg, Fed. Rep. of Germany
[73] Assignee: Hilti Aktiengesellschaft, Fürstentum, Liechtenstein
[21] Appl. No.: 11,899
[22] Filed: Feb. 13, 1979
[30] Foreign Application Priority Data
Feb. 15, 1978 [DE] Fed. Rep. of Germany ....... 2806386
[51] Int. Cl.³ .............................................. F16L 3/00
[52] U.S. Cl. ..................................... 248/62; 248/74 R
[58] Field of Search ................ 248/62, 59, 74 B, 74 R
[56] References Cited
U.S. PATENT DOCUMENTS

| 508,914 | 11/1893 | Cain | 248/62 |
|---|---|---|---|
| 1,013,187 | 1/1912 | Lofton et al. | 248/62 X |
| 1,262,763 | 4/1918 | Farley | 248/62 |
| 1,598,385 | 8/1926 | Ogden | 248/62 |
| 2,338,031 | 12/1943 | Ellinwood | 248/74 B |
| 2,736,528 | 2/1956 | LeBrock | 248/59 X |
| 2,744,706 | 5/1956 | Gerdy | 248/62 X |
| 3,182,940 | 5/1965 | Emery et al. | 248/74 R |
| 3,273,838 | 9/1966 | Fletcher et al. | 248/62 |
| 3,628,760 | 12/1971 | Kindorf | 248/62 |

Primary Examiner—Francis K. Zugel
Attorney, Agent, or Firm—Toren, McGeady and Stanger

[57] ABSTRACT

A two-part clip is used to support pipe, cable or the like. The two-part clip includes a support part attachable to a support surface and a closure part mounted on the support part. The closure part and a portion of the support part form an arcuately shaped retaining section in which pipe or other elements can be held. The closure part is releasably engaged to the support part so that the retaining section can be opened by pivotably moving the closure part relative to the support part. The support part has an angularly shaped section extending from the retaining section which is attachable to the support surface. For adjustment between the support surface and the clip, an adapter can be placed between the angularly shaped section and the support surface.

8 Claims, 4 Drawing Figures

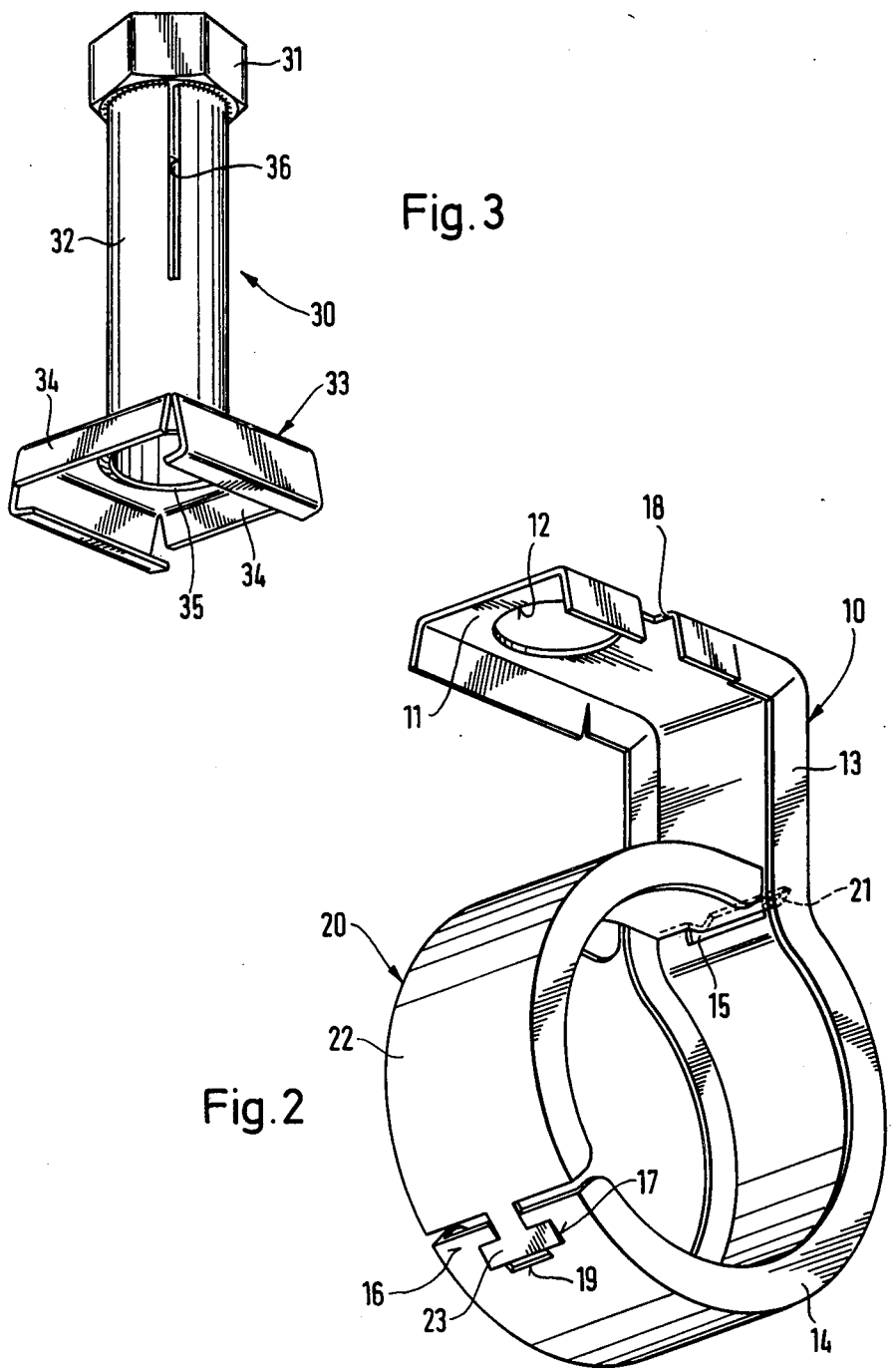

TWO-PART PIPE CLIP

SUMARY OF THE INVENTION

The invention is directed to a two-part clip for supporting pipe, cable or the like with the clip made up of a support part and a closure part with the closure part and a portion of the support part forming a retaining section for the pipe or other elements. The support part includes an angularly shaped end extending from the retaining section and the end can be provided with an adapter for securing the clip to a support surface such as a wall or ceiling.

For carrying pipe, cable or the like, known clips have been formed of a support member and a closure member connected to the support member. In these known clips, in most cases the two members are connected together by at least one screw. Tightening and loosening the screw is a relatively time-consuming operation and frequently requires special tools. Furthermore, in piping which is subject to vibration, there is always the danger that the screw connection will loosen with time. To avoid such a loosening action, special locking means for the screws have been required.

The primary object of the present invention is to provide a pipe clip which, without any special tools, affords a quick and secure engagement of the pipe or other material in the clip and also assures a rapid disassembly for the removal of the pipe or other material from the clip.

In accordance with the present invention, a closure member is provided which is pivotally connected to the support member in that region of the clip adjacent the angularly shaped end which is attachable to a support surface. The other end of the closure member is releasably engageable in a free end of the support member. Accordingly, no additional means are needed for attaching the closure member to the support member. The assembly of the clip on a pipe or cable can be effected in a very simple manner by placing the element to be supported in the retaining portion of the support member and by subsequently completing the retaining section with the closure member and locking the closure member into the support member. In such an assembly operation no special tools are required. Once assembled, the closure member can be easily released by use of a conventional screw driver.

For the simple and secure connection of the closure member to the support member, it is advantageous if the end of the support member spaced from the section attached to the support surface, is connected to the adjacent end of the closure member by means of a T-shaped snap-in closure. The T-shaped design of the engagement between the two members results in a form-locking connection which will not open even in the case of extreme load. The T-shaped connection is, however, not only the conventional T-shaped sections, but also such sections having a head portion and a reduced neck portion relative to the head portion. The head portion can be rectangular, arrow-shaped, circular or any other desired configuration. The only requirement is that the head portion is larger than the neck portion.

Large forces may act on the clip when it is used to support pipe, due to changes in the length of the pipe resulting from temperature differentials or vibration. To prevent the two-part clip from opening due to such forces, it is advantageous if one part of the snap-in closure includes a stop element oversized in at least one dimension relative to the corresponding portion of the closure formed in the other part of the clip. When an extreme load acts on the clip, the oversize feature of the closure prevents the fastened pipe or cable from becoming loosened. The dimensional difference providing the oversize feature can be relatively small, for example, a difference in dimension of a few tenths of a millimeter may be sufficient for securing a snap-in closure.

Depending on the manner in which it is used, the clip can be attached directly to a wall or ceiling, or it can be inserted into a rail or bar of essentially C-shaped cross-section which, in turn, is fastened to the wall or ceiling. There are other applications, however, in which pipe clips can be vertically adjustably connected to threaded studs or rods. In such an application, it is advantageous if an adapter is provided along with the threaded rod with the adapter being slidably movable onto the end of the support member which is connected to the support surface. Such an adapter which affords an accessory for the two-part clip embodying the present invention, provides a wider range of usage for the pipe clip. With such an adapter, the production costs for the pipe clip are not unduly increased. Advantageously, the adapter includes a threaded portion which can be rotated relative to the clip so that a vertical adjustment of the clip is possible even when the pipe is held within the retaining portion of the clip. By making the adapter a separate part, it is possible to produce the adapters economically in large numbers, since the adapter is independent of the size of the clip.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is a perspective view of the clip shown in FIG. 1; FIG. 3 is a perspective view of an adapter embodying the present invention for connecting the clip to a threaded rod.

DETAIL DESCRIPTION OF THE INVENTION

Figure 1:
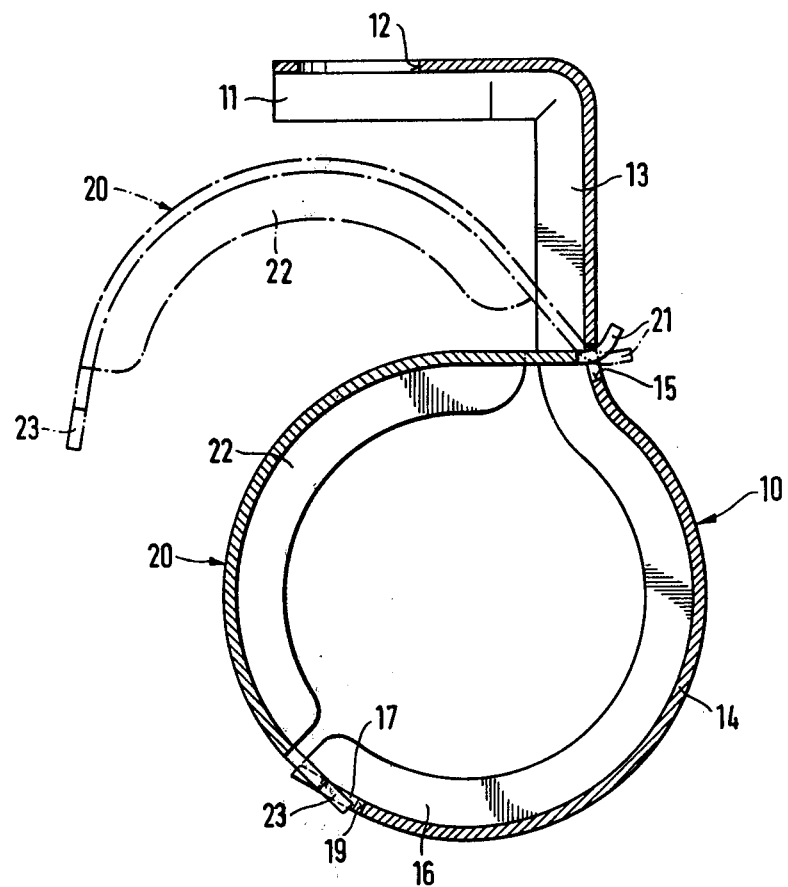
FIG. 1 is a sectional view through a two-part clip embodying the present invention.

In FIG. 1 a sectional view is shown through a clip embodying the present invention, and the clip is made up of a support member 10 and a closure member 20 with the closure member attached to the support member so that the combination of these two members forms an annular retaining section for pipe, cable or the like. Extending from the portion of the support member 10 forming the retaining section is an angular shaped part terminating in an end 11. The angular shaped end 11 can be provided with means for securing the clip to a wall or ceiling surface. Such attachment means are afforded by the channel or U-shaped cross-section of the angular shaped end 11 which facilitates the engagement of the support member 10 in a C-shaped sectional bar. Further, the angular shaped end 11 has an opening 12. The angular shaped end 11 includes a leg 13 which extends approximately at right angles to the section containing the opening 12 and leads into an arcuately shaped part 14 extending for approximately 180°. At the intersection of the leg 13 and the arcuate shaped part 14 there is a slot 15 formed through the support member 10. The opposite end 16 of the arcuate shaped part 14 is provided with a recess or slot 17.

Closure member 20 is releasably connected to the support member 10. The closure member is also arcuately shaped and combines with the arcuately shaped part 14 in forming the annular retaining section. At one end, the closure member 20 has a bent lug 21 which fits into and extends through the slot 15 in the support member 10 so that the closure member can be pivoted relative to the support member. In FIG. 1 the closure member is shown in full lines secured to the support member 10 and completing, in combination with the arcuately shaped part 14, the retaining section. Further, FIG. 1 also shows, in dot-dash lines, the outwardly pivoted position of the closure member 20, that is, with the retaining section open so that a pipe or other element can be placed into the clip. After a pipe has been inserted into the arcuately shaped part 14 of the support member 10, the closure member is pivoted back into the position shown in solid lines and is releasably connected to the support member by a snap-in closure. The snap-in closure is in the form of a stop element 23 projecting outwardly from the end of the closure member and it is secured within the slot 17 in the end 16 of the support member 10.

FIG. 2 displays a perspective representation of the clip shown in FIG. 1. In FIG. 2 the channel shaped or U-shaped cross-section of the support member 10 and of the closure member 20 can be seen most clearly. Furthermore, a laterally arranged groove 18 can be seen in the angularly shaped end 11 of the support member. The groove 18 permits the insertion of a tool when releasing the clip from a C-shaped support bar. Moreover, this figure clearly indicates the design of the snap-in closure. The stop element 23 projecting from the end of the closure member and the slot 17 in the corresponding end of the support member are both basically T-shaped. Furthermore, a slot-like projection or extension 19 from the slot 17 permits the insertion of a tool into the snap-in closure when the clip is to be opened.

An adapter 30 is illustrated in FIG. 3 and affords the adjustable connection of the clip to a threaded rod or stud. Adapter 30 is formed at one end by a hexagonal nut 31, a tubular shaped sleeve 32 is coaxial with, connected to, and extends axially from the nut, and a slip-on shoe 33 is mounted on the opposite end of the sleeve 32 from the nut 31. The slip-on shoe 33 has a channel-shaped cross-section such that the shoe can be slipped onto or clipped to the angular shaped end 11 of the support member 10. Cams 34 project from the shoe 33 in the same direction as the legs forming the channel-shaped cross-section and when the shoe 33 is positioned on the support member 10, the cams serve as stops and prevent any inadvertent release of the adapter 30 from the angularly shaped end 11 of the support member 10. At its lower end, the sleeve 32 has an outwardly flanged edge 35 providing an interconnection with the shoe 33 so as that the sleeve 32 and the nut 31 can be rotated relative to the shoe. Such rotatability permits the vertical adjustment of the clip when the nut 31 is in threaded engagement with a threaded rod. An axially extending slot 36 is formed in the sleeve 32 and serves to indicate the length by which the threaded rod is screwed into the adapter 30. By means of the slot 36 it is possible to avoid the adapter 30 being completely unscrewed from the threaded rod.

Figure 4:
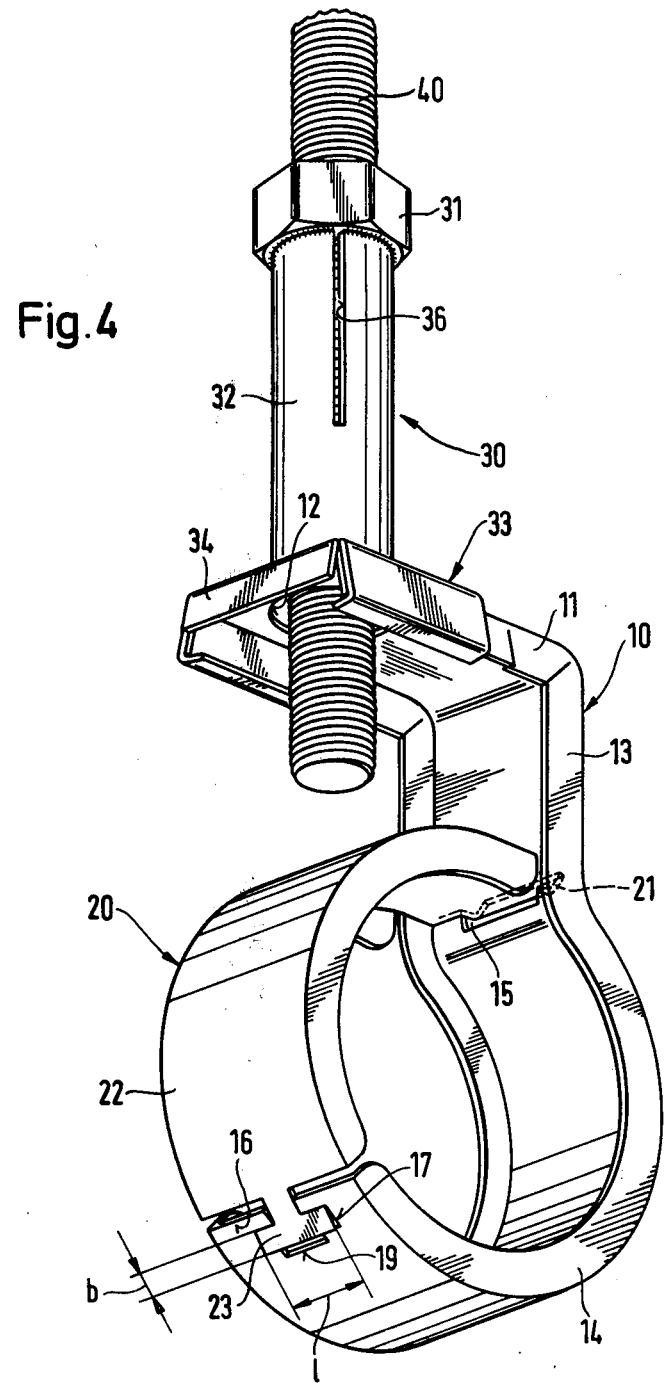
FIG. 4 is a perspective view illustrating the assembly of the pipe clip, shown in FIGS. 1 and 2, with the adapter of FIG. 3 by means of a threaded rod.

In FIG. 4 the the clip is made up of the assembly of the support member 10, the closure member 20 and the adapter 30. In addition, a threaded rod or stud 40 is screwed into the adapter 30. One end of the threaded rod 40 projects downwardly through the opening 12 in the angular shaped end 11 of the support member 10. Due to this arrangement, vertical adjustment of the clip is possible over a wide range. The threaded rod 40 is visible through the axially extending slot 36. Separation of the adapter 30 from the support member 10 is prevented by axially displacing the threaded rod 40 through the opening 12 so that sliding movement between the shoe 33 and the angular shaped end 11 of the support member 10 is not possible. The threaded rod can only be screwed downwardly through the sleeve 32 and the opening 12 to a limited extend so that it does not impair the pivotal movement of the closure member 20 relative to the support member 10.

To prevent the transmission of vibrations from a pipe or other element secured in the clip to the structural member supporting it, sound absorbing inserts can be placed in the channel-shaped cross-section of the support member 10 and of the closure member 20. Such inserts have the further advantage that the snap-in closure formed by the stop element 23 and the slot 17 is placed under an increased initial tension and, as a result, the danger of the closure opening is further reduced. To prevent, the stop element 23 from being displaced out of the slot 17 when high loads are acting on the clip, it is advangageous if the stop element is oversized in at least one dimension, either l or b, relative to the corresponding dimensions of the slot 17 in the end of the support member 10.

While specific embodiments of the invention have been shown and described in detail to illustrate the application of the inventive principles, it will be understood that the invention may be embodied otherwise without departing from such principles.

What is claimed is:

1. A two-part clip for supporting pipe, cable or the like, comprising a support member and a closure member engageable with said support member, a portion of said support member forming in combination with said closure member an annular retaining section which completely encircles and holds the element being supported, said support member including a first end part extending from said annular retaining section and arranged to be attached to a support and a second end forming a part of said annular retaining section, wherein the improvement comprises that said annular retaining section being arcuate from adjacent the intersection with said first end part to the second end thereof said closure member being arcuate and having a first end and a second end, the first end of said closure member is pivotally connected to said support member adjacent the intersection of said first end part and said annular retaining section and the second end of said closure member is releasably engageable with said second end of said support member, the pivotal connection of said closure member and said support member being approximately diagonally opposite the releasable locking engagement of said support member and said closure member, said second end of said support member has a slot therethrough, and the second end of said closure member has a projection extending outwardly therefrom with said projection fitting in releasable locking engagement into the slot in the second end of said support member, and said projection is T-shaped with the leg of the T-shaped projection extending generally in the circumferential direction of said annular retaining section and with the head extending transversely of the leg outwardly from the second end of said closure member, said slot in the second end of said support member being T-shaped corresponding to said T-shape projection, said T-shape slot having the leg portion thereof extending inwardly from the second end of said support member in the circumferential direction of said annular retaining section, and the head portion thereof extending transversely of the leg portion at the end of the leg portion inwardly from the second end of said support member, said T-shape slot having an extension projecting in the circumferential direction of said annular retaining section from the head portion thereof away from the second end of said support member so that the extension extends from the head of said T-shape projection when said closure member is in locking engagement with said support member whereby a tool can be inserted into said extension of said slot for releasing said closure member from locking engagement with said support member.

2. A two-part clip, as set forth in claim 1, wherein said support member has a slot extending therethrough at the intersection of said first end part and said support member, and the first end of said closure member has a lug extending therefrom through said slot and said lug being bent so that the surface of said slot contacting the surface of said bent lug of said closure member forms a pivot surface about which said closure member is pivotally displaceable.

3. A two-part clip, as set forth in claim 1, wherein said T-shape slot in the second end of said support member and the head of said T-shaped projection having a first dimension extending in the direction of the leg portion and a second dimension extending transversely of the first dimension, and one of the first and second dimensions of said T-shaped projection being oversized relative to the corresponding dimension of said slot in the second end of said support member.

4. A two-part clip, as set forth in claim 1, wherein a support adapter is slidable onto the first end part of said support member for attaching said support member to a support.

5. A two-part clip, as set forth in claim 1, wherein said support member is channel-shaped and has a web part and a leg extending angularly from each of the opposite edges of said web part, said legs extending inwardly from said web into the interior of said annular retaining section.

6. A two-part clip, as set forth in claim 5, wherein said closure member is channel-shaped and has a web part and a leg extending approximately perpendicular from each of the opposite edges of the web part, said legs extending inwardly from said web so that the legs extend into the interior of said annular retaining section.

7. A two-part clip, as set forth in claim 1, wherein said first end part is angularly shaped having a straight first section extending from the part of said support member forming said annular retaining section, and a straight second section spaced from said annular retaining section and extending approximately perpendicular to said first straight section.

8. A two-part clip, as set forth in claim 5, including an adapter having a shoe slidable onto the first end part of said support member, an axially extending tubular sleeve attached to said shoe and extending outwardly therefrom approximately perpendicularly to said first end part, and a nut secured to the opposite end of said tubular sleeve from said shoe.

* * * * *